United States Patent
Xu (10) Patent No.: US 12,479,501 B2
(45) Date of Patent: Nov. 25, 2025

(54) ESTIMATED RACK FORCE OFFSET COMPENSATION

(71) Applicant: STEERING SOLUTIONS IP HOLDING CORPORATION, Saginaw, MI (US)

(72) Inventor: Xinfu Xu, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 19 days.

(21) Appl. No.: 18/660,601

(22) Filed: May 10, 2024

(65) Prior Publication Data

US 2025/0333103 A1 Oct. 30, 2025

(30) Foreign Application Priority Data

Apr. 25, 2024 (CN) .......................... 202410508252.9

(51) Int. Cl.
  *B62D 6/00* (2006.01)
(52) U.S. Cl.
  CPC .................... *B62D 6/008* (2013.01)
(58) Field of Classification Search
  CPC ..................................... B62D 6/008
  See application file for complete search history.

(56) References Cited

U.S. PATENT DOCUMENTS

| | | | |
|---|---|---|---|
| 7,725,227 B2 | 5/2010 | Pattok | |
| 10,676,129 B2 | 6/2020 | Varunjikar | |
| 11,180,186 B2 | 11/2021 | Pramod | |
| 11,414,122 B2 | 8/2022 | Zheng | |
| 2012/0095649 A1 | 4/2012 | Klier | |
| 2014/0343790 A1* | 11/2014 | Hestermeyer | B62D 6/04 701/41 |
| 2020/0023889 A1 | 1/2020 | Rohrmoser | |
| 2020/0094873 A1 | 3/2020 | Hong | |
| 2021/0016826 A1 | 1/2021 | Naman | |
| 2021/0269087 A1 | 9/2021 | Zhao | |

(Continued)

FOREIGN PATENT DOCUMENTS

| | | |
|---|---|---|
| CN | 110654453 A | 1/2020 |
| DE | 102006022663 A1 | 11/2007 |
| DE | 102008042666 A1 | 5/2010 |

(Continued)

OTHER PUBLICATIONS

Official Letter and Translation dated Jan. 22, 2025 corresponding to German Patent Application No. 102024113309.0, 8 pages.

*Primary Examiner* — Xiao En Mo
(74) *Attorney, Agent, or Firm* — Dickinson Wright PLLC (57) ABSTRACT

A method for controlling a steering system of a vehicle includes obtaining a plurality of values corresponding to operation of the steering system, determining, based on the plurality of values, an estimated rack force, separately determining a long-term (LT) offset factor of the estimated rack force and a short-term (ST) offset factor of the estimated rack force, determining a total compensation value based on a combination of the LT offset factor and the ST offset factor, applying the total compensation value to the estimated rack force to obtain an compensated estimated rack force, and controlling at least one function of the steering system using the compensated estimated rack force.

20 Claims, 5 Drawing Sheets

(56) References Cited

U.S. PATENT DOCUMENTS

2023/0117916 A1    4/2023   Kitazume

FOREIGN PATENT DOCUMENTS

| | | |
|---|---|---|
| DE | 102017105370 A1 | 9/2018 |
| DE | 102020104463 B4 | 11/2022 |
| DE | 102019109006 B4 | 12/2022 |
| DE | 102023102609 A1 | 4/2024 |
| KR | 101992338 B1 | 6/2019 |
| KR | 20200041399 A | 4/2020 |

* cited by examiner

ESTIMATED RACK FORCE OFFSET COMPENSATION

CROSS-REFERENCE TO RELATED APPLICATIONS

This application claims the benefit of Chinese Patent Application No. 2024105082529, filed on Apr. 25, 2024. The entire disclosure of the application referenced above is incorporated herein by reference.

TECHNICAL FIELD

This disclosure relates to obtaining an accurate estimated rack force for a steering system of a vehicle.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to obtaining an estimated rack force for a steering system of a vehicle.

An aspect of the disclosed embodiments includes a method for controlling a steering system of a vehicle. The method includes obtaining a plurality of values corresponding to operation of the steering system, determining, based on the plurality of values, an estimated rack force, separately determining a long-term (LT) offset factor of the estimated rack force and a short-term (ST) offset factor of the estimated rack force, determining a total compensation value based on a combination of the LT offset factor and the ST offset factor, applying the total compensation value to the estimated rack force to obtain a compensated estimated rack force, and controlling at least one function of the steering system using the compensated estimated rack force.

In other aspects, a system for controlling one or more steering functions of a vehicle is configured to perform the methods described herein. In other aspects, a processing device is configured to execute instructions stored in memory to control one or more steering functions of a vehicle as described herein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

In a SbW steering system, rack force refers to a force transmitted (e.g., via a rack and pinion mechanism) to the wheels of the vehicle in response to the driver turning the steering wheel. Rack force may be calculated or estimated (e.g., as an estimated rack force). The estimated rack force signal may be used to provide accurate steering response, provide driver feedback, improve vehicle stability, etc.

Estimated rack force offset or error (i.e., an offset between actual and estimated rack force) can cause vehicle pull or other driver feel/feedback issues. The estimated rack force offset may be caused by various offset factors including, but not limited to, short-term offset factors such as crowned or other uneven driving surfaces or road conditions, side winds, etc., and long-term offset factors such as roadwheel actuator (RWA) system friction, chassis misalignment, offsets or errors in various input signals (e.g., torque signals, position signals, etc.), and/or other vehicle issues. Accordingly, as an indicator of a difference between actual and estimated rack force, the estimated rack force offset may vary over time and in different vehicle operating conditions.

As one example, a residual position and/or RWA system friction errors cause an estimated rack force offset. The estimated rack force offset then causes (i) effort offset, which leads to imbalanced steering effort and vehicle pull, and/or (ii) RWA position tracking command offset, which leads to vehicle pull.

Estimated rack force offset compensation systems and methods according to the present disclosure are configured to determine (e.g., calculate, model, etc.) an accurate estimated rack force offset and control various steering system functions accordingly. As one example, short-term and long-term offset factors are separately determined such that the estimated rack force offset accounts for the variability in offset factors.

In an example implementation, rack load bias is filtered from various measurement signals when certain conditions are met (e.g., when the vehicle is traveling straight and various signals/measurements are greater than or less than respective thresholds) prior to translation to steering torque feedback. In other words, the learning of the estimated rack force offset is performed during straight driving conditions. In this manner, offset factors (e.g., both long-term and short-term offset factors) are obtained when the effects of various other inputs are minimized.

In some examples, the techniques described herein may be combined with an active pull compensation feature. An example active pull compensation feature or function corrects vehicle pull issues by compensating for handwheel torque offsets detected by the steering system. These torque offsets may include the short-term and long-term offset factors described herein. When compensation for the offset factors is applied, the need for the driver to provide a constant input torque to counter these offsets is greatly reduced.

As described herein, short-term offset factors may correspond to conditions external to the vehicle. Accordingly, short-term correction or compensation values may be determined relatively quickly and applied only during a current ignition cycle. As an example, the short-term compensation values or data are not stored between ignition cycles. In some examples, the short-term correction data may be reset within the current ignition cycle in response to detected changes in driving conditions (e.g., handwheel torque, handwheel position, rack position, rack force, lateral acceleration, and/or yaw rate exceeding respective thresholds).

Conversely, long-term offset factors may correspond to vehicle issues (e.g., conditions internal to the vehicle, respective vehicle systems and sensors, etc.). Since long term offset factors are typically related to the vehicle itself and not the driving/operating environment, the long-term offset factors are corrected for relatively slowly (i.e., relative to the short-term offset factors). Accordingly, long-term compensation values or data may be stored and used in subsequent ignition cycles. In an example, a total offset compensation value is a sum of short-term and long-term compensation values/terms. The total compensation value may be scaled based on vehicle speed before being applied to the steering system.

Figure 1A:
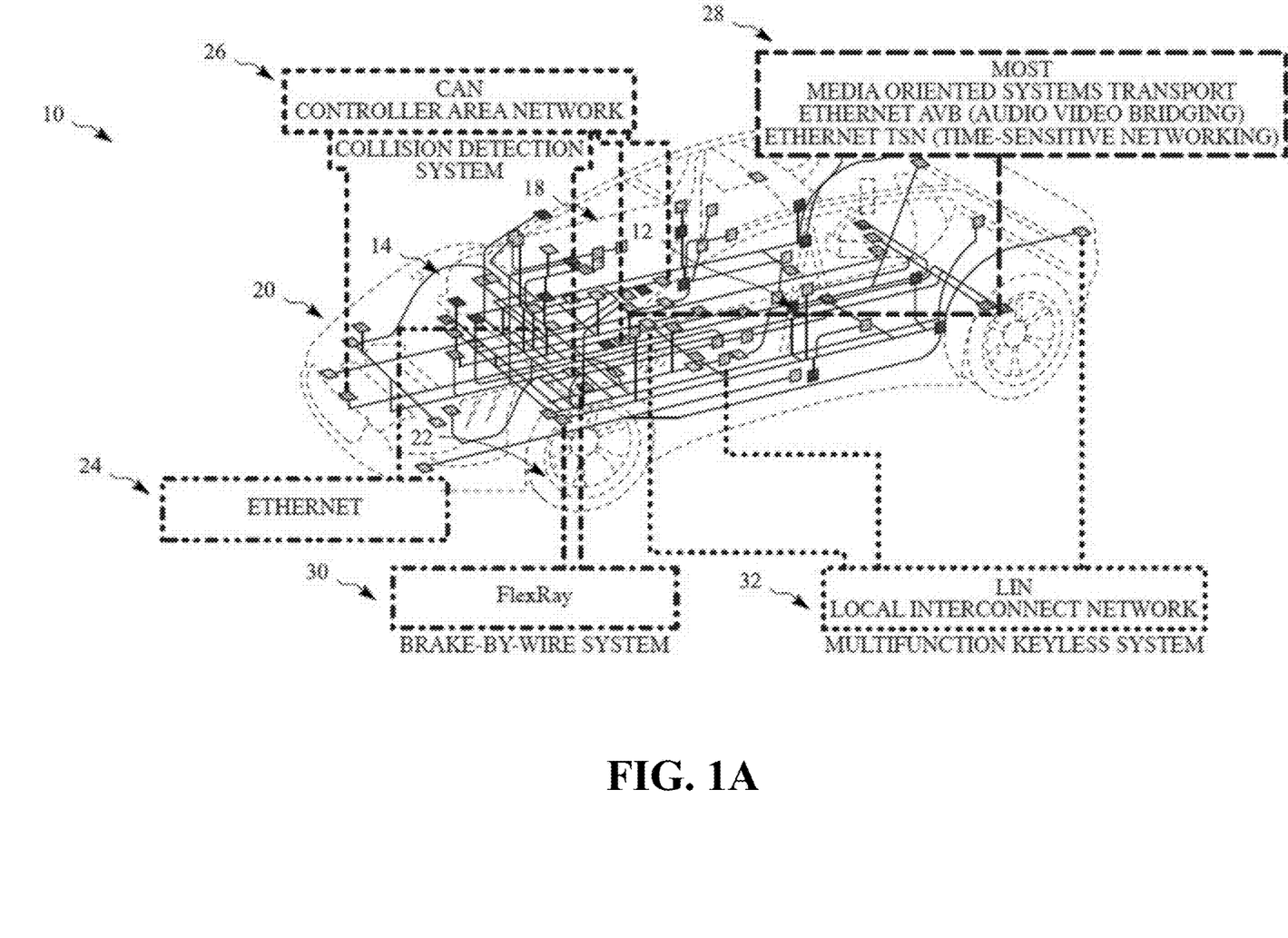
FIG. 1A generally illustrates a vehicle according to the principles of the present disclosure.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 1B:
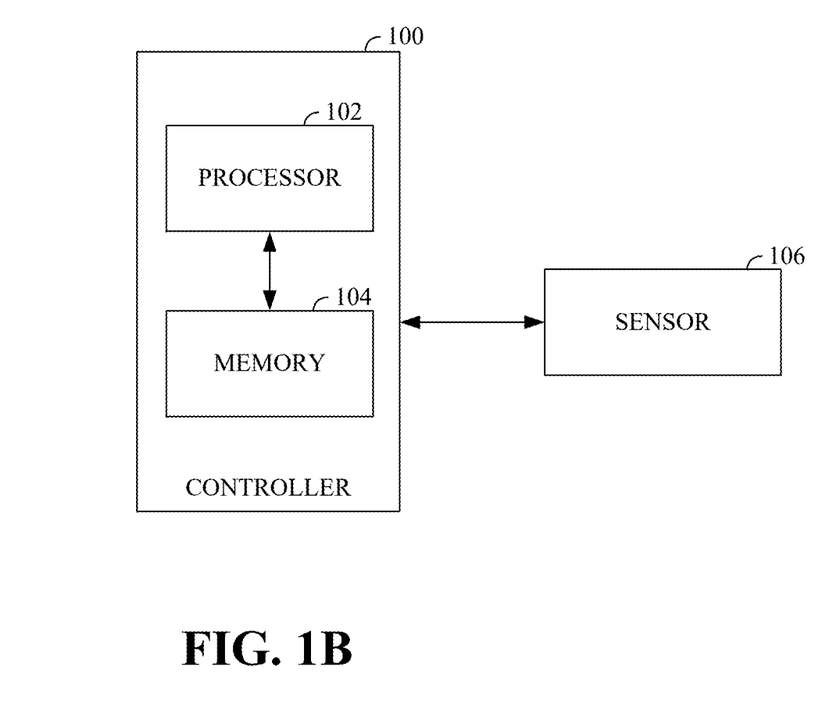
FIG. 1B generally illustrates a controller according to the principles of the present disclosure.

In some embodiments, the vehicle 10 may include a controller, such as controller 100, as is generally illustrated in FIG. 1B. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, controller 100 may be configured to implement the estimated rack force offset compensation systems and methods of the present disclosure. However, the systems and methods described herein as implemented by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 2:
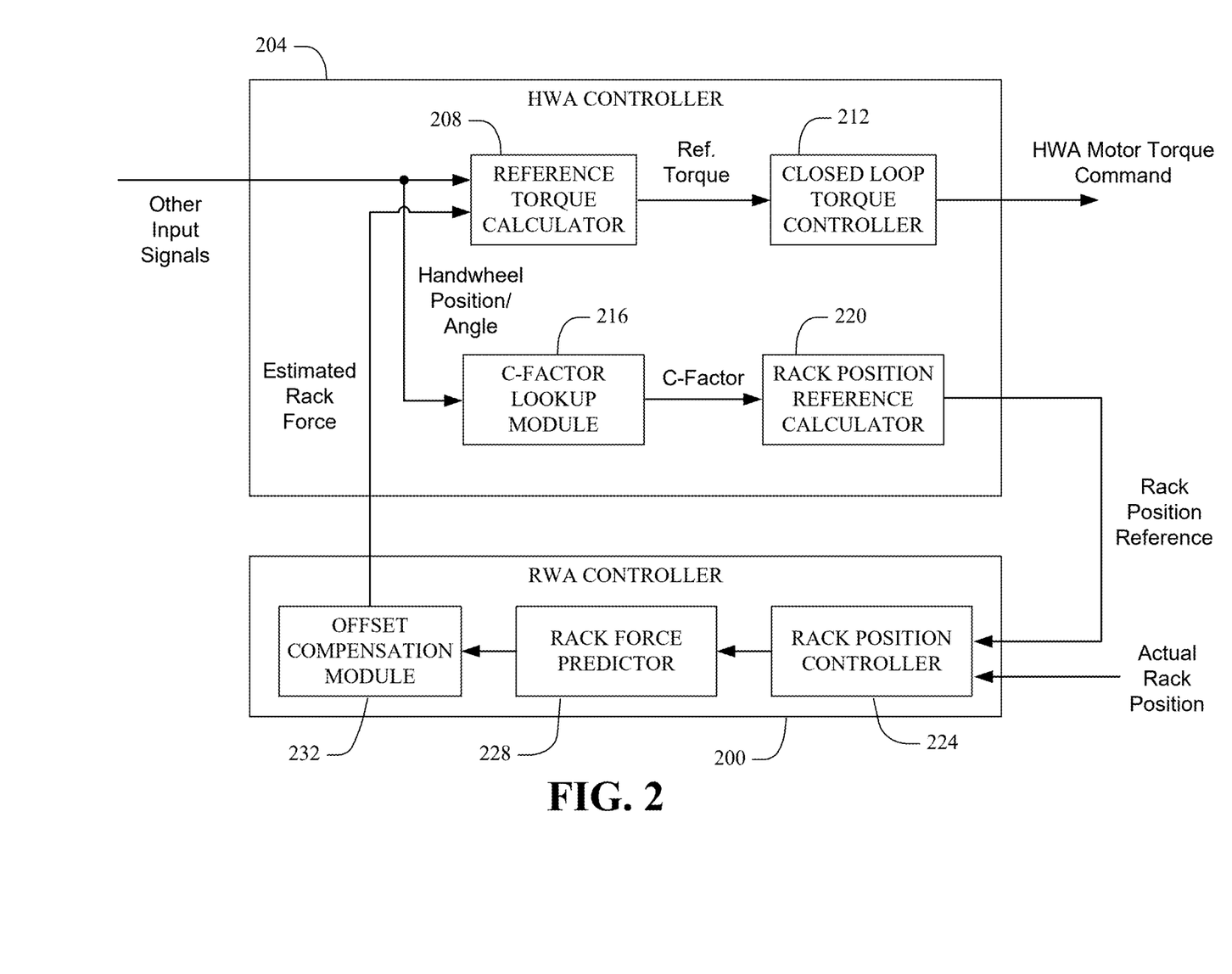
FIG. 2 generally illustrates an example rack or roadwheel actuator controller and a handwheel actuator controller of a steer-by-wire system according to the principles of the present disclosure.

FIG. 2 illustrates an example rack or RWA controller 200 and column or handwheel actuator (HWA) controller 204 of a steering system according to the present disclosure. For example, the HWA controller 204 is configured to generate a handwheel actuator (HWA) motor torque command based on an estimated rack force (e.g., an estimated rack force signal) received from the RWA controller 200 and one or more other input signals (e.g., vehicle speed, handwheel position, and handwheel velocity). The RWA controller 200 is configured to determine the estimated rack force based on an actual rack position (e.g., a signal indicating the actual rack position) and a rack position reference signal (e.g., a rack position reference indicative of a target rack position).

As one example, the HWA controller 204 includes a reference torque calculator 208 configured to calculate a reference torque based on the estimated rack force and the one or more other input signals. For example, the reference torque corresponds to a sum of various inputs/measurements such as effort, hysteresis, damping return, catch, etc. A closed loop (e.g., a PID closed loop) torque controller 212 is configured to generate and output the motor torque command based at least in part on the reference torque. The motor torque command is provided as a control signal to control a motor of the handwheel actuator.

The estimated rack force corresponds to a target value for the motor torque command. Accordingly, the estimated rack force (and any estimated rack force offset or error) is a critical factor for determining the force provided by the motor of the handwheel actuator.

In some examples, the HWA controller 204 may further include a C-factor lookup module 216 and a rack position reference calculator 220. For example, the rack position reference calculator 220 is configured to generate the rack position reference based on a C-factor received from the C-factor lookup module 216. The C-factor may be determined based on a handwheel angle ("HwAg") corresponding to driver input (e.g., a handwheel angle indicating driver intent conveyed via the handwheel). Example systems and methods for obtaining the rack position reference and the C-factor are described in more detail in U.S. patent application Ser. No. 18/318,657, filed on May 16, 2023, the entire contents of which are incorporated herein by reference.

The RWA controller 200 includes a rack position controller 224 (e.g., a PID rack position controller) configured to generate one or more rack position control signals based on the actual rack position and the rack position reference (e.g., based on a difference between the actual rack positon and the rack position reference). For example, the rack position control signals may include, but are not limited to, rack motor velocity and motor torque command (e.g., indicative of an amount of torque applied by the driver) signals. In this manner, rack position is controlled to follow the intent of the driver (as indicated by the rack reference position).

A rack force predictor 228 generates the estimated rack force based on outputs of the rack position controller 224 (e.g., based on a function of the rack motor velocity, the rack motor torque command, etc.). In various examples, the estimated rack force may be calculated based on the amount of torque applied to the handwheel by the driver (as indicated by the rack motor torque command, various sensor signals, etc.).

As described herein, the estimated rack force typically includes an offset or error (e.g., an estimated rack force offset). The RWA controller 200 according to the present disclosure includes an offset compensation module 232 configured to determine an accurate estimated rack force offset (a compensated estimated rack force offset) and modify the estimated rack force accordingly as described below in more detail.

Figure 3:
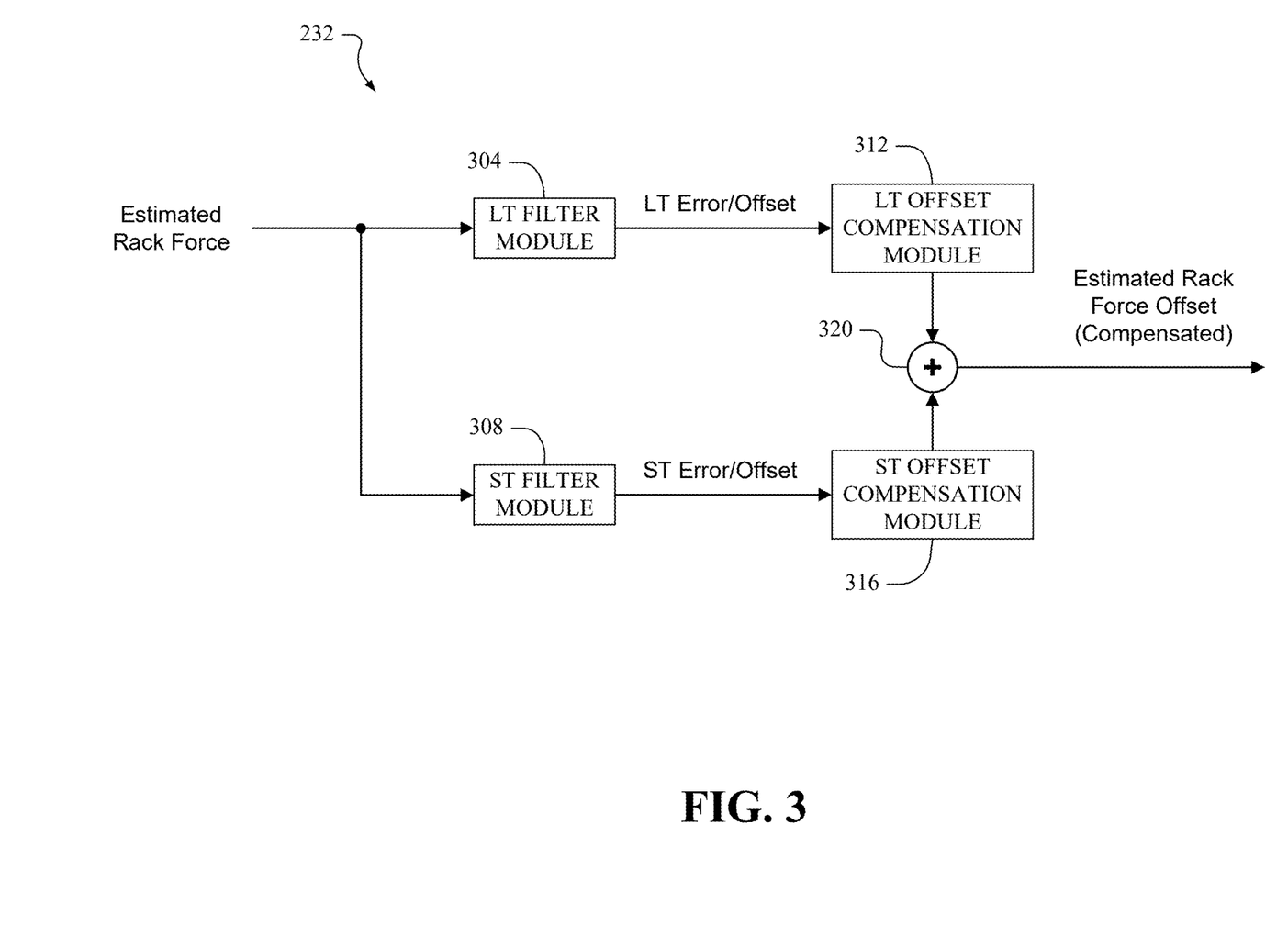
FIG. 3 generally illustrates an example implementation of an estimated rack force offset compensation module of a roadwheel actuator controller according to the principles of the present disclosure.

FIG. 3 illustrates an example implementation of the offset compensation module 232. In some examples, the offset compensation module 232 is configured to obtain long-term and short-term offset factors during a learning mode or period. For example, learning the long-term and short-term offset factors may be conditional upon one or more enablement conditions being met. The enablement conditions may correspond to driving and vehicle conditions in which the long-term and short-term offset factors can be accurately calculated and variation is minimized. The enablement criteria may include, but are not limited to:

Maximum handwheel torque is less than a threshold;
Handwheel angle is less than a threshold;
Rack position is less than a threshold;
Handwheel angle and rack position calculations meet respective minimum confidence values;
Handwheel velocity is less than a threshold;
Rack velocity is less than a threshold;
Vehicle speed is within a predetermined range (e.g., between minimum and maximum thresholds);
Rate of change of vehicle speed is less than a threshold;
Vehicle lateral velocity is less than a threshold;
Vehicle yaw rate is less than a threshold; and
Rack force is less than a threshold.

In response to selected enablement conditions being met (e.g., some or all of the above-listed conditions), the offset compensation module 232 obtains the long-term (LT) and short-term (ST) offset factors based on the estimated rack force and, in some examples, various other input signals (sensor signals, measurement signals, etc.). For example, the offset compensation module 232 includes an LT filter module 304 and an ST filter module 308, which may correspond to respective low pass filters or filter circuitry. Each of the filter modules 304 and 308 filters out different low frequency elements corresponding to the estimated rack force to obtain the respective LT and ST offset factors. For example, the filter modules 304 and 308 correspond to low pass filters having different gains and cutoff frequencies. Accordingly, the LT filter module 304 may learn the LT offset factor over a first learning period while the ST filter module 308 generates the ST offset factor learned over a second learning period shorter than the first learning period. The first and second learning period may be defined by respective calibration values.

In an example, the output of the LT filter module 304 (i.e., the LT offset factor) is a result of filtering out the low frequency elements of the estimated rack force and may include higher frequency elements associated with ST errors. Conversely, the output of the ST filter module 304 is a result of filtering out the low frequency elements of the estimated rack force and elements associated with LT errors. In other words, the ST filter module 308 may have a higher frequency than the LT filter module 304.

The LT offset factor and the ST offset factor are respectively provided to an LT offset compensation module 312 and an ST offset compensation module 316, which respectively output LT and ST offset compensation values. The LT and ST offset compensation values are calculated based on the LT and ST offset factors. The LT and ST compensation values are combined (e.g., summed at summing module 320) to generate a compensated estimated rack force offset. The estimated rack force is modified/adjusted based on the compensated estimated rack force offset. For example, the compensated estimated rack force offset is subtracted from (or, in some examples, added to) the estimated rack force to obtain a compensated estimated rack force according to the present disclosure. The compensated estimated rack force is provided to the HWA controller 204 for calculation of the motor torque command as described above.

In some examples, the compensated estimated rack force offset may be scaled based on vehicle speed (e.g., multiplied by a scaling factor that increases with speed) and/or not applied at vehicle speeds below a threshold).

Figure 4:
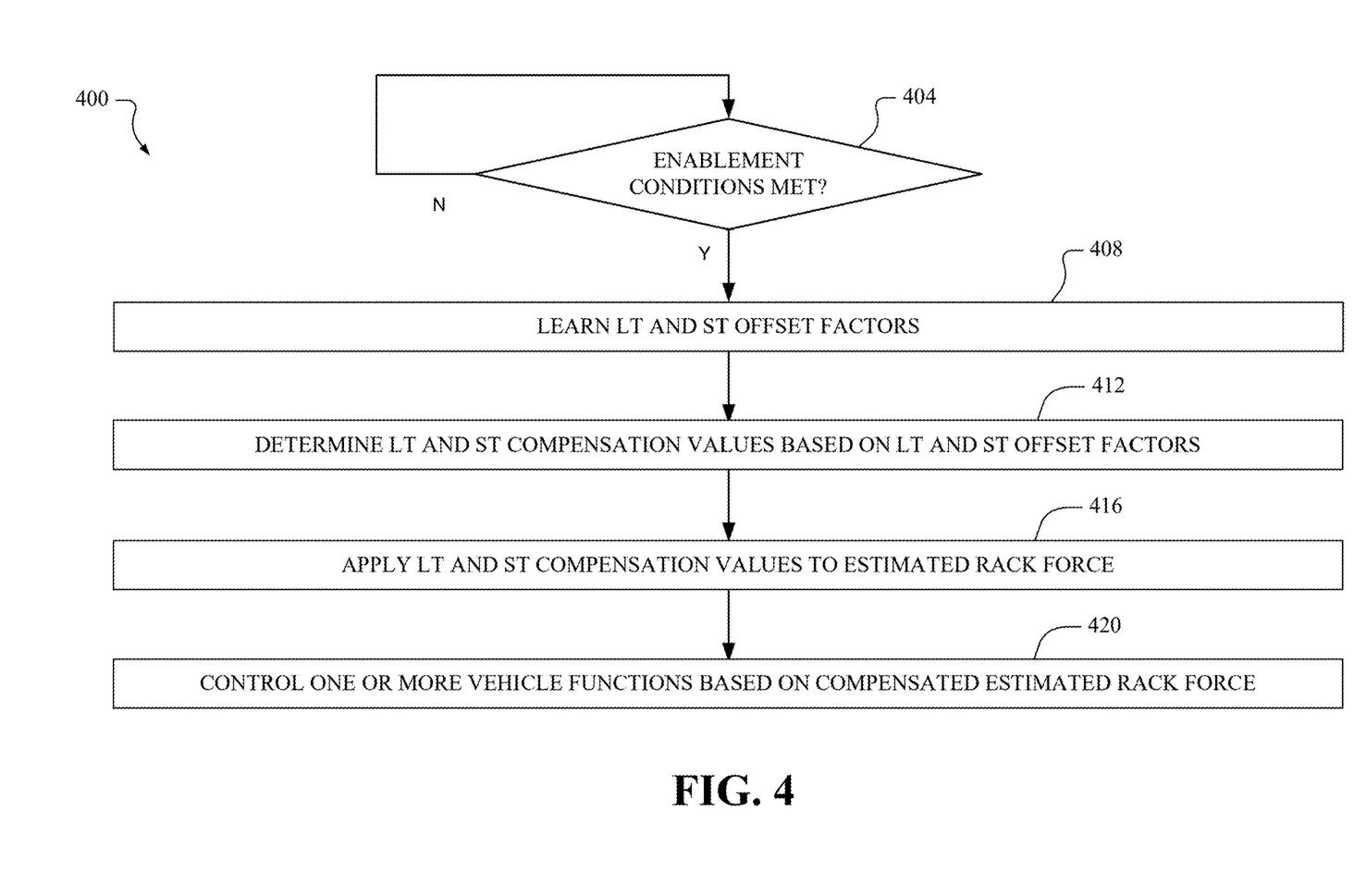
FIG. 4 generally illustrates steps of an example, estimated rack force offset compensation method according to the principles of the present disclosure.

FIG. 4 is a flow diagram generally illustrating an estimated rack force offset compensation method 400 according to the principles of the present disclosure. For example, one or more computing devices, processors or processing devices, etc. are configured to execute instructions to implement the method 400, such as one or more of the processors of the systems described herein (e.g., a computing device or processor of a vehicle configured to implement the offset compensation module 232 and/or other components of the RWA controller 200, the HWA controller 204, etc.).

At 404, the method 400 includes determining whether one or more enablement conditions for learning the LT and ST offset factors are met as described herein. If true, the method 400 continues to 408. If false, the method 400 may repeat the determination performed at 404 until the one or more enablement conditions are met.

At 408, the method 400 includes learning the LT and ST offset factors as described herein. For example, the offset compensation module 232 applies filtering or other processing techniques to separately isolate and identify LT and ST offsets (e.g., using respective filter modules).

At 412, the method 400 includes determining LT and ST offset compensation values based on the LT and ST offset factors. At 416, the method 400 includes applying the LT and ST compensation values to the estimated rack force. For example, the LT and ST compensation values are combined (e.g., summed) to obtain a compensated estimated rack force offset, which is then subtracted (or added to) the estimated rack force to obtain a compensated estimated rack force.

At 420, one or more vehicle functions are controlled based on the compensated estimated rack force. For example, the compensated estimated rack force is used to control at least one function of a steering system, such as control of a motor or motor actuator torque as described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling a steering system of a vehicle, the method comprising:
   obtaining a plurality of values corresponding to operation of the steering system;
   determining, based on the plurality of values, an estimated rack force;
   separately determining a long-term (LT) offset factor of the estimated rack force and a short-term (ST) offset factor of the estimated rack force;
   determining a total compensation value based on a combination of the ST offset factor and the LT offset factor;
   applying the total compensation value to the estimated rack force to obtain an compensated estimated rack force; and
   controlling at least one function of the steering system using the compensated estimated rack force.

2. The method of claim 1, further comprising determining the estimated rack force based on a rack position reference.

3. The method of claim 2, further comprising determining the estimated rack force based on a difference between the rack position reference and an actual rack position.

4. The method of claim 1, further comprising controlling handwheel motor torque based on the compensated estimated rack force.

5. The method of claim 1, wherein determining the LT offset factor and the ST offset factor includes applying filtering to the estimated rack force.

6. The method of claim 5, wherein the filtering includes using different low pass filters to respectively determine the LT offset factor and the ST offset factor.

7. The method of claim 1, further comprising determining whether one or more enablement conditions are met and separately determining the LT offset factor and the ST offset factor in response to determining that the one or more enablement conditions are met.

8. A system for controlling one or more steering functions of a vehicle, the system comprising:
   one or more sensors configured to obtain a plurality of values corresponding to the one or more steering functions; and
   a controller configured to
   determine, based on the plurality of values, an estimated rack force,
   separately determine a long-term (LT) offset factor of the estimated rack force and a short-term (ST) offset factor of the estimated rack force,
   determine a total compensation value based on a combination of the LT offset factor and the ST offset factor,
   apply the total compensation value to the estimated rack force to obtain an compensated estimated rack force, and
   control the one or more steering functions using the compensated estimated rack force.

9. The system of claim 8, wherein the controller is configured to determine the estimated rack force based on a rack position reference.

10. The system of claim 9, wherein the controller is configured to determine the estimated rack force based on a difference between the rack position reference and an actual rack position.

11. The system of claim 8, wherein the controller is configured to control handwheel motor torque based on the compensated estimated rack force.

12. The system of claim 8, wherein determining the LT offset factor and the ST offset factor includes applying filtering to the estimated rack force.

13. The system of claim 12, wherein the filtering includes using different low pass filters to respectively determine the LT offset factor and the ST offset factor.

14. The system of claim 8, wherein the controller is configured to determine whether one or more enablement conditions are met and separately determine the LT offset factor and the ST offset factor in response to determining that the one or more enablement conditions are met.

15. A processing device configured to execute instructions stored in memory to control one or more steering functions of a vehicle, the instructions comprising:
   obtaining a plurality of values corresponding to the one or more steering functions;
   determining, based on the plurality of values, an estimated rack force;
   separately determining a long-term (LT) offset factor of the estimated rack force and a short-term (ST) offset factor of the estimated rack force;
   determining a total compensation value based on a combination of the LT offset factor and the ST offset factor;
   applying the total compensation value to the estimated rack force to obtain an compensated estimated rack force; and
   controlling the one or more steering functions using the compensated estimated rack force.

16. The processing device of claim 15, wherein the instructions include determining the estimated rack force based on a rack position reference.

17. The processing device of claim 16, wherein the instructions include determining the estimated rack force based on a difference between the rack position reference and an actual rack position.

18. The processing device of claim 15, wherein the instructions include controlling handwheel motor torque based on the compensated estimated rack force.

19. The processing device of claim 15, wherein determining the LT offset factor and the ST offset factor includes applying filtering to the estimated rack force, and wherein the filtering includes using different low pass filters to respectively determine the LT offset factor and the ST offset factor.

20. The processing device of claim 15, wherein the instructions include determining whether one or more enablement conditions are met and separately determining the LT offset factor and the ST offset factor in response to determining that the one or more enablement conditions are met.

* * * * *